United States Patent
Ko et al.

(10) Patent No.: US 10,591,697 B2
(45) Date of Patent: Mar. 17, 2020

(54) CAMERA MODULE ACTUATOR

(71) Applicant: SAMSUNG ELECTRO-MECHANICS CO., LTD., Suwon-si (KR)

(72) Inventors: Joo Yul Ko, Suwon-si (KR); Joo Hyoung Lee, Suwon-si (KR); Jong Woo Lee, Suwon-si (KR); Je Hyuk Ryu, Suwon-si (KR); Woo Young Choi, Suwon-si (KR); Soo Woong Lee, Suwon-si (KR); Byung Joo Hong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 101 days.

(21) Appl. No.: 15/491,210

(22) Filed: Apr. 19, 2017

(65) Prior Publication Data

US 2018/0074283 A1 Mar. 15, 2018

(30) Foreign Application Priority Data

Sep. 12, 2016 (KR) ........................ 10-2016-0117470

(51) Int. Cl.
| | | |
|---|---|---|
| *G02B 7/02* | (2006.01) | |
| *G02B 7/09* | (2006.01) | |
| *H02P 8/00* | (2006.01) | |
| *H02P 6/00* | (2016.01) | |
| *H02P 25/034* | (2016.01) | |
| *H02P 7/02* | (2016.01) | |
| *H02K 41/035* | (2006.01) | |

(52) U.S. Cl.
CPC ........... *G02B 7/09* (2013.01); *H02K 41/0356* (2013.01); *H02P 6/006* (2013.01); *H02P 7/02* (2016.02); *H02P 8/005* (2013.01); *H02P 25/034* (2016.02); *H02P 2203/11* (2013.01)

(58) Field of Classification Search
CPC ....................................................... G02B 7/09
USPC ........................................................ 359/814
See application file for complete search history.

(56) References Cited

U.S. PATENT DOCUMENTS

2006/0127074 A1  6/2006  Noji
2010/0110217 A1  5/2010  Shibuno et al.
(Continued)

FOREIGN PATENT DOCUMENTS

CN    1790147 A    6/2006
CN  101729773 A    6/2010
(Continued)

OTHER PUBLICATIONS

Korean Office Action dated Aug. 30, 2017 in corresponding Korean Patent Application No. 10-2016-0117470 (3 pages in English and 3 pages in Korean).
(Continued)

*Primary Examiner* — James C. Jones
(74) *Attorney, Agent, or Firm* — NSIP Law

(57) ABSTRACT

A camera module actuator includes, a magnet, a coil, a driver, and a position estimating processor. The coil is disposed to face the magnet. The driver is configured to move the magnet by applying a driving signal to the coil. The position estimating processor is configured to estimate a position of the magnet from an oscillating signal. A frequency of the oscillating signal varies according to a movement of the magnet.

16 Claims, 5 Drawing Sheets

(56) References Cited

U.S. PATENT DOCUMENTS

| 2014/0104710 | A1 | 4/2014 | Heo et al. |
| 2015/0172521 | A1 | 6/2015 | Yasukochi et al. |
| 2015/0346453 | A1* | 12/2015 | Cheong ............... H04N 5/2257 359/824 |

FOREIGN PATENT DOCUMENTS

| CN | 103728819 A | 4/2014 |
| CN | 104395805 A | 3/2015 |
| JP | 2010-151986 A | 7/2010 |
| JP | 2014-191092 A | 10/2014 |
| JP | 2015-197627 A | 11/2015 |
| KR | 10-2007-0108347 A | 11/2007 |
| KR | 10-2013-0077216 A | 7/2013 |
| KR | 10-2014-0088308 A | 7/2014 |

OTHER PUBLICATIONS

Chinese Office Action dated Aug. 30, 2019 in corresponding Chinese Patent Application No. 201710407416.9 (7 pages in English, 6 pages in Chinese).

\* cited by examiner

CAMERA MODULE ACTUATOR

CROSS-REFERENCE TO RELATED APPLICATION(S)

This application claims the benefit under 35 USC 119(a) of Korean Patent Application No. 10-2016-0117470 filed on Sep. 12, 2016 in the Korean Intellectual Property Office, the entire disclosure of which is incorporated herein by reference for all purposes.

BACKGROUND

1. Field

The following description relates to a camera module actuator.

2. Description of Related Art

In general, portable communications terminals, such as mobile phones, personal digital assistants (PDAs), portable personal computers (PCs), and similar electronic devices, have been used to not only transmit text messages and voice data, but also image data. In order to meet the demands of such a trend, camera modules have been standardly installed in the portable communications terminals to allow users to capture images, use video chat features, and the like.

Generally, a camera module includes a lens barrel having lenses therein. The lens barrel is accommodated inside a housing. The housing also accommodates an image sensor to covert light forming images of subjects into electric signals. As camera modules, single focus camera modules capturing objects using fixed focuses may be employed, but as a result of technology advancements, a camera module including an actuator capable of performing autofocusing adjustments has been adopted. In addition, a camera module may employ an actuator having an optical image stabilization (OIS) function, to reduce resolution degradation caused by handshake.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments include a camera module actuator able to precisely detect a position of a magnet, without employing a hall sensor.

In one general aspect, a camera module actuator detects a position of a magnet from an oscillating signal with a variable frequency corresponding to a movement of the magnet.

In accordance with an embodiment, there is provided a camera module actuator, including: a magnet; a coil disposed to face the magnet; a driver configured to move the magnet by applying a driving signal to the coil; and a position estimating processor configured to estimate a position of the magnet from an oscillating signal, wherein a frequency of the oscillating signal varies according to a movement of the magnet.

The position estimating processor may estimate the position of the magnet from the frequency of the oscillating signal calculated by counting a reference clock using the oscillating signal.

The position estimating processor may calculate the frequency of the oscillating signal using the counted number of the reference clock and a frequency of the reference clock.

The position estimating processor sequentially calculates the frequency of the oscillating signal by temporally delaying a counting point at reference times.

The position estimating processor may estimate the position of the magnet, using information regarding the position of the magnet corresponding to the frequency of the oscillating signal.

The position estimating processor may include an oscillating circuit generating the oscillating signal and may include an inductor configured to determine the frequency of the oscillating signal.

The inductor may be located within a range of a magnetic field of the magnet.

The position estimating processor may generate a frequency divided signal by dividing the oscillating signal according to a reference ratio, and estimate the position of the magnet from a frequency of the frequency divided signal calculated by counting a reference clock using the frequency divided signal.

The frequency divided signal may have a frequency lower than the frequency of the oscillating signal.

A magnetic substance may be disposed between the oscillating circuit and the magnet.

In accordance with an embodiment, there is provided a camera module actuator, including: a magnet; a coil disposed to face the magnet; a driver configured to move the magnet by applying a driving signal to the coil; and a position estimating processor may include an inductor and configured to estimate a position of the magnet by converting an inductance of the inductor changed based on a movement of the magnet into a frequency.

The position estimating processor may include an oscillating circuit may include the inductor and configured to generate an oscillating signal, and wherein a frequency of the oscillating signal varies based on the inductance of the inductor.

The position estimating processor may estimate the position of the magnet from the frequency of the oscillating signal calculated by counting a reference clock using the oscillating signal.

The position estimating processor may sequentially calculate the frequency of the oscillating signal by temporally delaying a counting point at reference times.

The position estimating processor may estimate the position of the magnet, using information about the position of the magnet corresponding to the frequency of the oscillating signal.

The position estimating processor may generate a frequency divided signal by dividing the oscillating signal based on a reference ratio, and estimate the position of the magnet from a frequency of the frequency divided signal calculated by counting a reference clock using the frequency divided signal.

In accordance with another embodiment, there is provided a camera module actuator, including: a magnet; a coil disposed to face the magnet; a position estimating processor configured to estimate a position of the magnet by detecting frequency variations of an oscillating signal corresponding to a movement of the magnet and output a feedback signal indicative thereof; and a driver configured to provide a driving force to the magnet based on an input signal received and the feedback signal.

The driver may be configured to provide the driving force to the magnet based on the input signal and the feedback signal in any one of an initial position of a lens barrel, a movement of the lens barrel from an initial position to a target position, and a maintenance of the target position.

The camera module actuator may further include: a frequency dividing processor configured to divide the oscillating signal to have a low frequency to determine the position of the magnet.

The camera module actuator may further include: an arithmetic processor configured to calculate a frequency of the frequency divided oscillating signal output from the frequency dividing processor at a point in time delayed from one measurement time point by a reference time using a counted number of frequency signals of a reference clock and a frequency of the reference clock.

The reference time may be set to be shorter than a period of the frequency divided oscillating signal.

The driver and the position estimating processor may be disposed outside of the coil or in a hollow portion of the coil, inside of the coil.

In accordance with a further embodiment, there is provided a camera module, including: a lens barrel; a housing configured to accommodate the lens barrel; and an actuator configured to move the lens barrel in an optical axis direction, wherein the actuator may include a magnet, a coil, a driver configured to apply a driving signal to the coil to produce a driving force to the magnet and drive the lens barrel, and a position estimating processor may include an oscillating processor may include an oscillating circuit configured to produce an oscillating signal based on a movement of the magnet, and an arithmetic processor configured to calculate a frequency of the oscillating signal, wherein the position estimating processor may be configured to estimate a position of the magnet by converting a change in inductance of the oscillating circuit, based on a movement of the magnet, into a frequency.

The arithmetic processor may count the oscillating signal using a reference clock, and the frequency of the oscillating signal from the oscillating circuit may be calculated using a counted number of the reference clock and a frequency of the reference clock.

The camera module may further include: a frequency dividing processor configured to divide the oscillating signal to have a low frequency.

The arithmetic processor may include arithmetic operators respectively and sequentially configured to calculate frequencies of the frequency divided oscillating signal by delaying a measurement time point of one period of the frequency divided oscillating signal, at predetermined reference times.

Other features and aspects will be apparent from the following detailed description, the drawings, and the claims.

Figure 1:
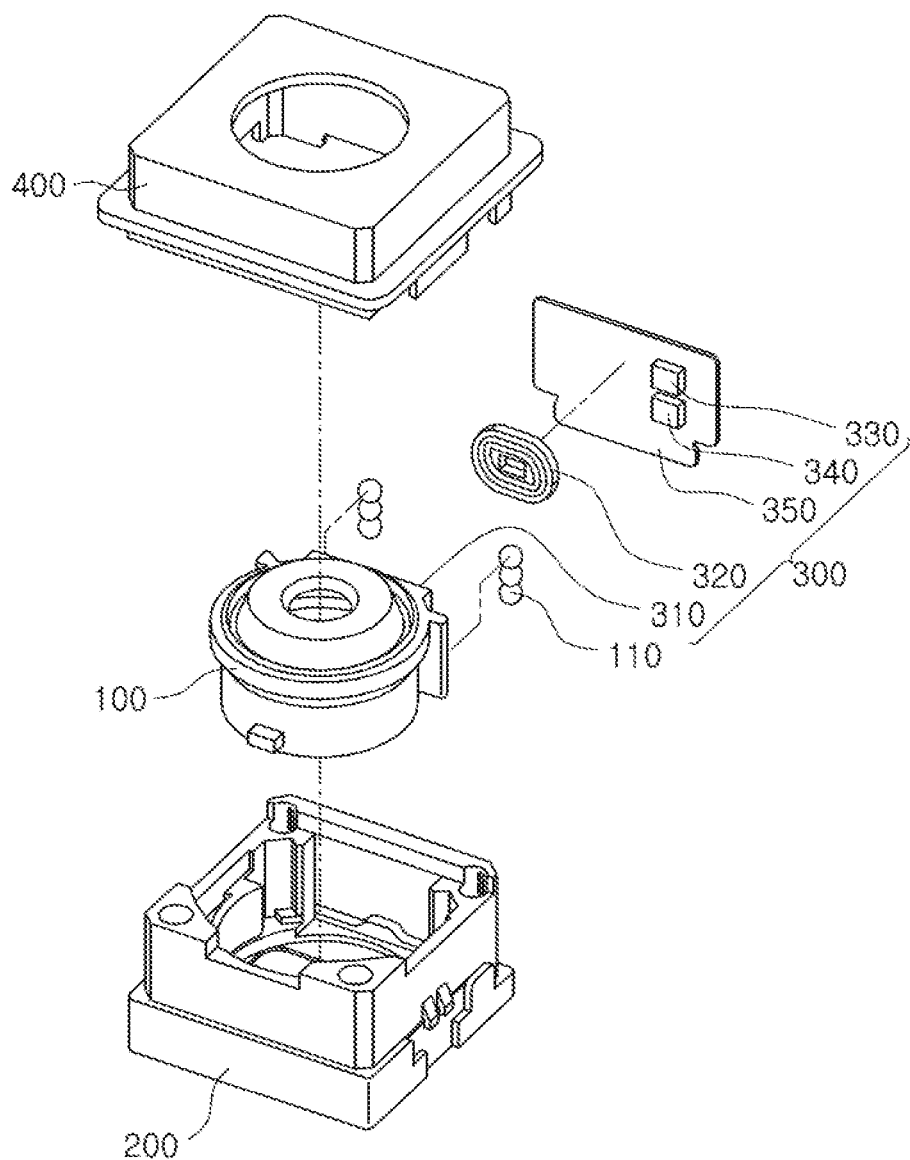
FIG. 1 is an exploded perspective view of a camera module, according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms, including technical terms and scientific terms, used herein have the same meaning as how they are generally understood after an understanding of the disclosure of this application. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

FIG. 1 is an exploded perspective view of a camera module, according to an example.

With reference to FIG. 1, a camera module according to an example includes a lens barrel 100, a housing 200, an actuator 300, and a case 400. In one embodiment, the lens barrel 100 has a hollow cylindrical shape in which at least one lens capturing an image of a subject is accommodated. A lens is provided in the lens barrel 100 along an optical axis. In an example, an optical axis direction refers to a direction parallel with respect to a longitudinal direction of the lens barrel 100. Also, the optical axis is a line along which there is some degree of rotational symmetry in an optical system such as a camera lens or microscope. The optical axis is an imaginary line that defines the path along which light propagates through at least one lens, up to first approximation. For a lens system including lenses and mirrors, the axis passes through the center of curvature of each surface, and coincides with the axis of rotational symmetry. The optical axis is often coincident with the system's mechanical axis, but not always, as in the case of off-axis optical systems.

The lens barrel 100 is disposed inside the housing 200 and coupled thereto. The lens barrel 100 moves inside the housing 200 in one direction, in detail, along an optical axis direction, for autofocusing.

The housing 200 accommodates the lens barrel 100 in such a manner that the lens barrel 100 moves along the optical axis direction. Thus, the housing 200 has an internal space formed to accommodate the lens barrel 100 therein. As a guide portion guiding a movement of the lens barrel 100 when the lens barrel 100 moves in the optical axis direction within the housing 200, at least one ball bearing 110 is provided in the lens barrel 100 in the optical axis direction. Although FIG. 1 illustrates three ball bearings 110 to move the lens barrel 110 in the optical axis direction, a single ball bearing 110 may be implemented or more than three ball bearings 110 may be implemented, on each guide portion of the lens barrel.

At least one ball bearing 110 is disposed between the lens barrel 100 and the housing 200 to facilitate the movement of the lens barrel 100 in the optical axis direction through rolling motion. At least one ball bearing 110 is in contact with an outer surface of the lens barrel 100 and an inner surface of the housing 200 to guide the movement of the lens barrel 100 in the optical axis direction.

Because at least one ball bearing 110 supports the lens barrel 100 when the lens barrel 100 moves in the optical axis direction within the housing 200, the lens barrel 100 moves in parallel to an optical axis. The case 400 is combined with the housing 200 and forms an appearance of a camera module, according to an example.

Figure 2:
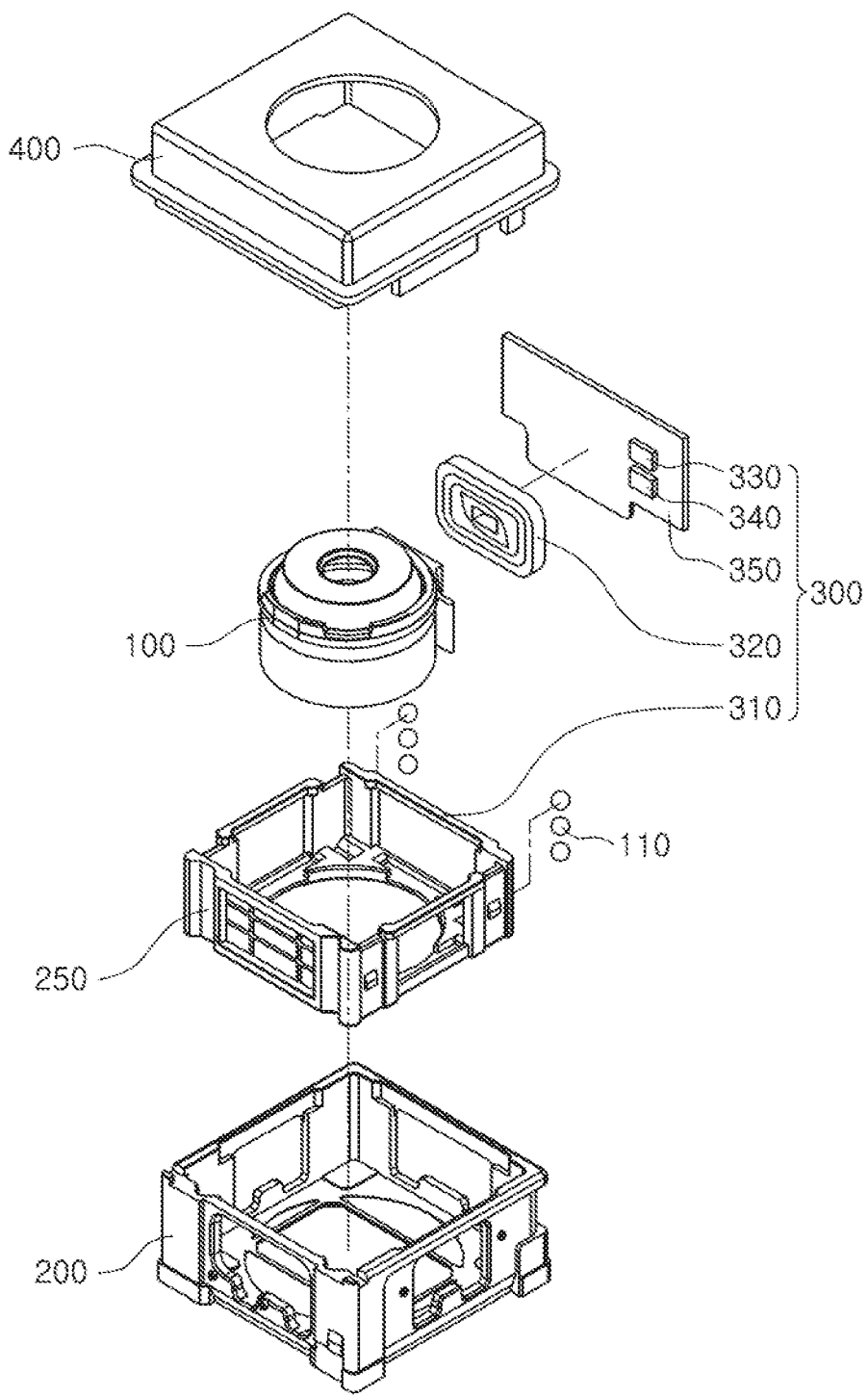
FIG. 2 is an exploded perspective view of a camera module, according to another example.

FIG. 2 is an exploded perspective view of a camera module, according to another example.

With reference to FIG. 2, the camera module according to the example includes a lens barrel 100, a housing 200, the holder 250, an actuator 300, and a case 400.

Because the camera module according to the example of FIG. 2 is similar to the camera module according to the example of FIG. 1, in terms of structural configurations thereof, the same or overlapping descriptions will be omitted, and differences therebetween will be principally described.

Comparing the camera module according to the example of FIG. 1 with the camera module according to the example of FIG. 2, the camera module according to the example of FIG. 2 may further include the holder 250 accommodating the lens barrel 100 therein.

The holder 250 accommodates the lens barrel 100 therein and is movable within the housing 200 in an optical axis direction. A magnet 310 is disposed on one side of the holder 250 to move the holder 250 accommodating the lens barrel 100 in the optical axis direction.

At least one ball bearing 110 is disposed on one side of the holder 250 in the optical axis direction, to guide and support a movement of the holder 250 when the holder 250 moves in the optical axis direction within the housing 200. In an alternative configuration, the at least one ball bearing 110 is disposed on one internal corner or side of the housing 200 and sliding within a guiding portion of the housing 200. The at least one ball bearing 110 would support the movement of the holder 250 when the holder 250 moves in the optical axis direction within the housing 200.

The configuration of the camera module according to the example of FIG. 2 is similar to that of the camera module according to the example of FIG. 1 except that the holder 250 accommodating the lens barrel 100 moves in the optical axis direction. Thus, the camera module according to the example of FIG. 1 will be mainly described. The following description may be applied to the camera module according to the example of FIG. 2, of course.

In addition, referring to FIG. 1, the actuator 300 performs driving to allow the lens barrel 100 to move in the optical axis direction. The actuator 300 includes a magnet 310, a coil 320, a driver 330, and a position estimating processor 340, and may further include a substrate 350.

The magnet 310 is disposed on one side of the lens barrel 100, and the coil 320 is disposed on one side of the substrate 350 mounted on the housing 200 to face the magnet 310. In one configuration, the substrate 350 is a flexible printed circuit board. Although not illustrated in FIG. 1, the actuator 300 may further include a yoke mounted on the other surface of the substrate 350 to prevent leakage of magnetic flux generated between the magnet 310 and the coil 320, and the magnet 310 may include two magnetic bodies polarized with respect to each other to facilitate movement of the lens barrel 100. In one embodiment, the magnetic bodies may be positioned side by side along the optical axis or, in another embodiment, the magnetic bodies may be positioned one on top of another perpendicular to the optical axis.

The driver 330 applies a driving signal to the coil 320 to provide driving force to the magnet 310, and the lens barrel 100 moves in the optical axis direction by the driving force of the magnet 310. For example, when the driving signal from the driver 330 is provided to the coil 320, magnetic flux is generated in the coil 320. The magnetic flux generated in the coil 320 interacts with a magnetic field of the magnet 310 so that the magnet 310 generates the driving force.

The driver 330 includes an H bridge circuit capable of being bidirectionally driven, therein, and applies the driving signal to the coil 320 using a voice coil motor method.

As the driver 330 applies the driving signal to the coil 320 to provide the driving force to the magnet 310 and drive the lens barrel 100, the position estimating processor 340 estimates a position of the magnet 310 moved by driving of the driver 330. The position estimating processor 340 provides an estimated position of the magnet 310 to the driver 330 as a feedback signal, and the driver 330 precisely adjusts the position of the magnet 310 by using the feedback signal generated from the position estimating processor 340.

The position estimating processor 340, according to an example, estimates the position of the magnet 310 by detecting variations in a frequency of an oscillating signal according to, corresponding to, or based on the movement of the magnet 310.

The driver 330 and the position estimating processor 340 may be mounted on the substrate 350 to face the magnet 310, and the substrate 350 may be fixed to or movably positioned with the housing 200.

Although FIG. 1 illustrates that the driver 330 and the position estimating processor 340 are disposed outside of the coil 320, in an alternative embodiment, the driver 330 and the position estimating processor 340 may be disposed in a hollow portion of the coil 320, the inside of the coil 320. In addition, although the driver 330 and the position estimating processor 340 are illustrated as being mounted on one substrate 350 in FIG. 1, the driver 330 and the position estimating processor 340 may be formed on two different or separate substrates. Further, the two different substrates may be disposed spaced apart, to oppose each other, based on the lens barrel 100. In an alternative embodiment, the two different substrates may be disposed operatively connected to each other.

Figure 3:
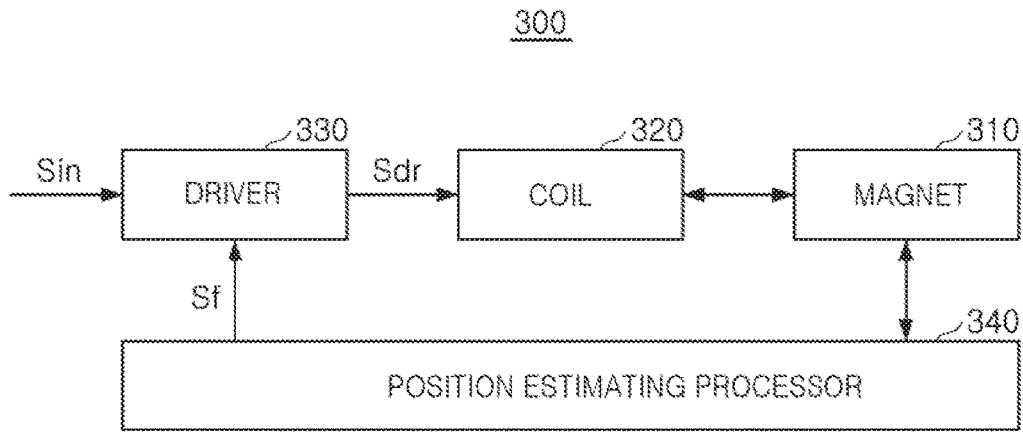
FIG. 3 is a block diagram of an actuator employed in a camera module, according to an example.

FIG. 3 is a block diagram of an actuator employed in a camera module, according to an example. Hereinafter, a driving method of an actuator according to an example will be described in detail with reference to FIGS. 1 to 3.

The driver 330 receives an input signal $S_{in}$ applied from an external source and a feedback signal $S_f$ generated by the position estimating processor 340, and provides a driving signal $S_{dr}$ to the coil 320.

The driver 330 provides a driving force to the magnet 310 according to an initial operation mode, an autofocusing mode, and a maintenance mode. The initial operation mode corresponds to a mode to maintain an initial position of the lens barrel 100, the autofocusing mode corresponds to a mode to move the lens barrel 100 from an initial position to a target position, and the maintenance mode corresponds to a mode to maintain the target position.

The driver 330 provides the driving force to the magnet 310 using the input signal $S_{in}$ applied externally and the feedback signal $S_f$ in the initial mode, the autofocusing mode, and the maintenance mode.

For example, when the driving signal $S_{dr}$ from the driver 330 is applied to the coil 320, the magnet 310 receives the driving force through electromagnetic interaction between the coil 320 and the magnet 310, and the lens barrel 100 is moved in an optical axis direction through a support and guidance of the at least one ball bearing 110.

The position estimating processor 340 detects the position of the magnet 310 moving through electromagnetic interaction between the magnet 310 and the coil 320 to generate the feedback signal $S_f$, which is transmitted to the driver 330. The position estimating processor 340 includes at least one inductor, and estimates a position of the magnet 310 by converting a change in inductance of the inductor according to, corresponding to, or based on the movement of the magnet 310, into a frequency.

Figure 4:
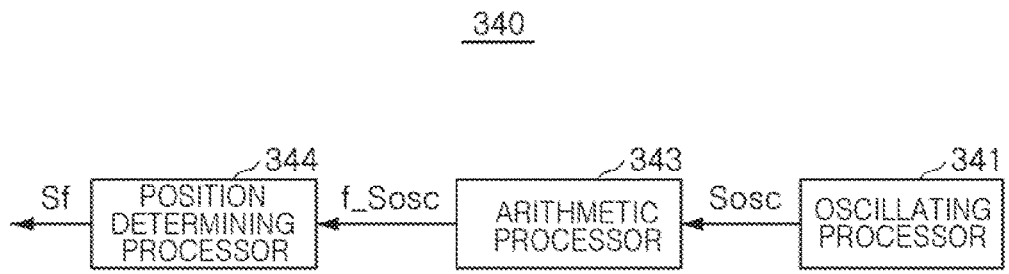
FIG. 4 is a block diagram illustrating a position estimating processor, according to an example.

FIG. 4 is a block diagram illustrating a position estimating processor according to an example.

Hereinafter, an operation of detecting a position of the magnet 310 with the position estimating processor 340 will be described with reference to FIGS. 3 and 4.

The position estimating processor 340, according to an example, includes an oscillating processor 341, an arithmetic processor 343, and a position determining processor 344.

The oscillating processor 341 includes an oscillating circuit to generate an oscillating signal $S_{osc}$. The oscillating circuit includes at least one inductor, and may further include one or more capacitors and one or more resistors. In an example, the oscillating circuit includes an LC oscillator configured to include at least one inductor and at least one capacitor, and may be configured in the same manner as that of a Colpitts oscillator. A frequency of the oscillating signal $S_{osc}$ of the oscillating circuit is determined by inductance of the at least one inductor.

For example, when the oscillating circuit is implemented by the LC oscillator configured of an inductor and a capacitor, a frequency f of the oscillating signal $S_{osc}$ is represented by the following equation. In the equation, I represents an inductance of the inductor, and c represents a capacitance of the capacitor.

$$f = \frac{1}{2\pi\sqrt{lc}} \qquad \text{[Equation 1]}$$

Because the position estimating processor 340 is mounted on the substrate 350 (see FIG. 1) disposed to face the magnet 310 as described above, the oscillating processor 341 may be located to be within a range of a magnetic field produced by the magnet 310. Because the oscillating processor 341 is located within the range of the magnetic field of the magnet 310, an inductance of at least one inductor of the oscillating circuit within the position estimating unit 340 is affected by the magnetic field of the magnet 310.

For example, when the driver 330 moves the magnet 310 using the driving force, because a magnitude of the magnetic field of the magnet 310 changes, such magnitude change influences the inductance of at least one inductor L of the oscillating circuit. Thus, a frequency of the oscillating signal $S_{osc}$ output from the oscillating processor 341 changes according to the movement of the magnet 310.

In order to increase a rate of change in the inductance of the inductor L of the oscillating processor 341 based on a positional movement of the magnet 310, a magnetic substance with a relatively high magnetic permeability is provided between the magnet 310 and the oscillating processor 341.

The arithmetic processor 343 calculates a frequency $f\_S_{osc}$ of the oscillating signal $S_{osc}$ that is output from the oscillating processor 341. For example, the arithmetic processor 343 calculates the frequency $f\_S_{osc}$ of the oscillating signal $S_{osc}$ using a reference clock CLK.

According to an example, the arithmetic processor 343 counts the oscillating signal $S_{osc}$ using the reference clock CLK, and the frequency $f\_S_{osc}$ of the oscillating signal $S_{osc}$ is calculated using the counted number of the reference clock CLK and the frequency of the reference clock CLK. In an example, the arithmetic processor 343 counts the oscillating signal $S_{osc}$ during a reference interval using the reference clock CLK.

The position determining processor 344 receives the frequency $f\_S_{osc}$ of the oscillating signal $S_{osc}$ from the arithmetic processor 343 and determines a position of the magnet 310 according to the frequency $f\_S_{osc}$ of the oscillating signal $S_{osc}$. The position determining processor 344 includes a memory, and information regarding the position of the magnet 310 corresponding to the frequency $f\_S_{osc}$ of the oscillating signal $S_{osc}$ is stored in the memory. The memory may be implemented by a non-volatile memory including one of a flash memory, an electrically erasable programmable read-only memory (EEPROM), and a ferroelectric random access memory (FeRAM). The memory may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent after an understanding of the disclosure of this application that the computing system or computer may further include an application chipset, a camera image processor, a mobile Dynamic Random Access Memory (DRAM), or any other component suitable for inclusion in a computing system or computer. The memory controller and the flash memory device may constitute a solid-state drive or disk (SSD) that uses non-volatile memory to store data.

For example, when the frequency $f\_S_{osc}$ of the oscillating signal $S_{osc}$ is transmitted from the arithmetic processor 343 to the position determining processor 344, the position determining processor 344 determines the position of the magnet 310 according to information regarding the position of the magnet 310 prestored in the memory.

Figure 5:
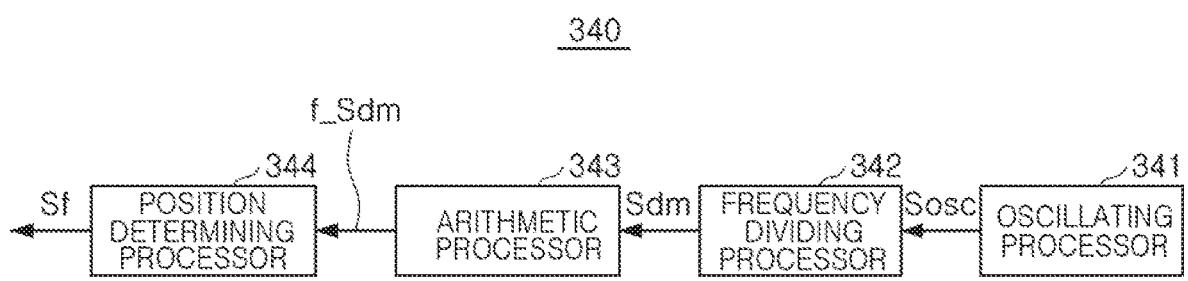
FIG. 5 is a block diagram illustrating a position estimating processor, according to another example.
Figure 6:
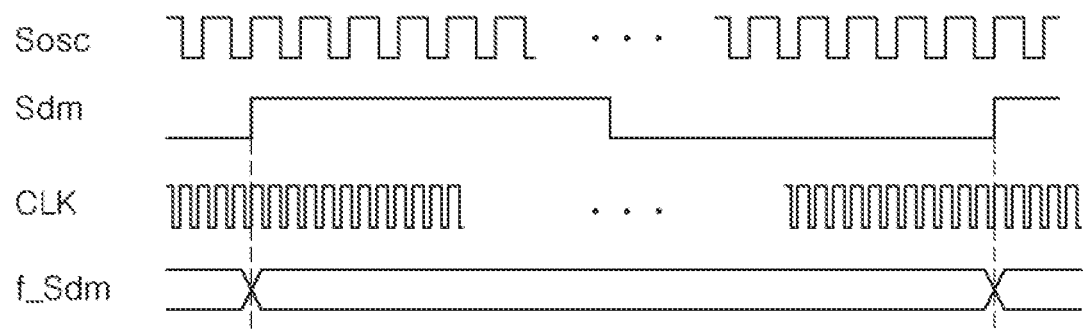
FIG. 6 illustrates signal waveforms of main portions of the position estimating processor, according to the example of FIG. 5.

FIG. 5 is a block diagram illustrating a position estimating processor, according to another example, and FIG. 6 illustrates signal waveforms of main portions of the position estimating processor according to the example of FIG. 5.

Hereinafter, an operation to detect a position of the magnet 310 using the position estimating processor 340 will be described in detail with reference to FIGS. 3, 5, and FIG. 6.

A position estimating processor 340 according to an example includes an oscillating processor 341, a frequency dividing processor 342, an arithmetic processor 343, and a position determining processor 344.

Since the position estimating processor 340 according to the example of FIG. 5 is similar to the position estimating processor 340 according to the example of FIG. 4 in terms of a configuration, the same or overlapping descriptions will be omitted and differences will be mainly described.

Comparing the position estimating processor 340 according to the example of FIG. 5 with the position estimating processor 340 according to the example of FIG. 4, the position estimating processor 340 according to the example of FIG. 5 may further include the frequency dividing processor 342. In an event that the oscillating signal $S_{osc}$ output from the oscillating processor 341 is a high frequency signal, and the oscillating signal $S_{osc}$ has a high frequency that is counted using the reference clock CLK, an error to determine a position of the magnet 310 may occur.

The position estimating processor 340, according to the example, further includes the frequency dividing processor 342 dividing the oscillating signal $S_{osc}$ to have a low frequency to accurately determine the position of the magnet 310.

The frequency dividing processor 342 generates a frequency divided signal $S_{dm}$ by dividing the oscillating signal $S_{osc}$ output from the oscillating processor 341 according to a preset reference ratio. In an example, the reference ratio may be $2^t$, where t is an integer equal to 10 or more but less than 14.

The oscillating signal $S_{osc}$ is divided by the frequency dividing processor 342 so that a frequency of the frequency divided signal $S_{dm}$ is lower than a frequency of the oscillating signal $S_{osc}$. For example, the oscillating signal $S_{osc}$ having a high frequency generated by the oscillating processor 341 is divided into the frequency divided signal $S_{dm}$ having a low frequency by the frequency dividing processor 342.

The arithmetic processor 343 calculates a frequency $f\_S_{dm}$ of the frequency divided signal $S_{dm}$ output from the frequency dividing processor 342. For example, the arithmetic processor 343 calculates the frequency $f\_S_{dm}$ of the frequency divided signal $S_{dm}$ using the reference clock CLK.

For example, the arithmetic processor 343 counts a number of frequency signals of the reference clock CLK within a single period of the frequency divided signal $S_{dm}$, and calculates the frequency $f\_S_{dm}$ of the frequency divided signal $S_{dm}$ using the counted number of the reference clock CLK and the frequency of the reference clock CLK.

The position determining processor 344 receives the frequency $f\_S_{dm}$ of the frequency divided signal $S_{dm}$ from the arithmetic processor 343 and determines the position of the magnet 310 according to the frequency $f\_S_{dm}$ of the frequency divided signal $S_{dm}$. The position determining processor 344 includes a memory, and information regarding the position of the magnet 310 corresponding to the frequency $f\_S_{dm}$ of the frequency divided signal $S_{dm}$ is stored in the memory. The memory may be implemented by a non-volatile memory including one of a flash memory, an electrically erasable programmable read-only memory (EEPROM), and a ferroelectric RAM (Fe RAM).

For example, when the frequency $f\_S_{dm}$ of the frequency divided signal $S_{dm}$ is transmitted to the position determining processor 344 from the arithmetic processor 343, the position determining processor 344 determines the position of the magnet 310 according to the information regarding the position of the magnet 310, prestored in the memory.

Figure 7:
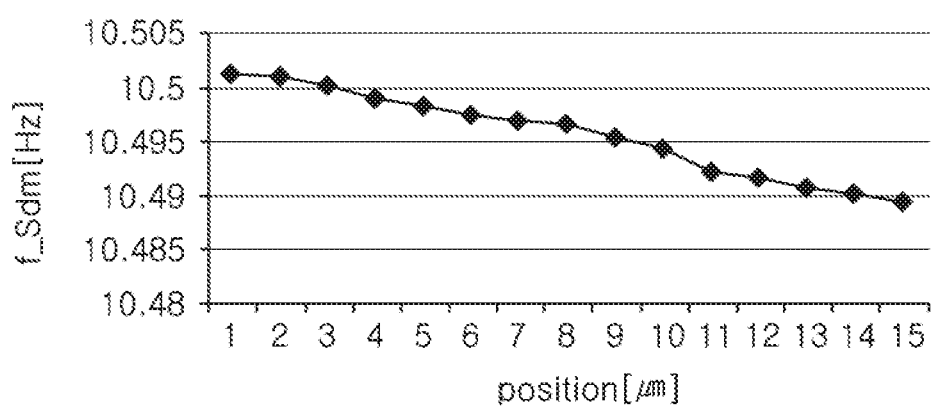
FIG. 7 is a drawing illustrating data regarding positional information of a magnet corresponding to a frequency of a division signal, according to an example.

FIG. 7 is a drawing illustrating data regarding positional information of a magnet corresponding to a frequency of a frequency divided signal according to an example.

With reference to FIG. 7, the frequency $f\_S_{dm}$ of the frequency divided signal $S_{dm}$ decreases as the magnet 310 moves. For example, when the magnet 310 moves within the range of approximately 1 [μm] to 15 [μm], the frequency f_Sdm of the frequency divided signal Sdm varies within a range of 10.502 [Hz] to 10.488 [Hz].

According to an example, the position determining processor 344 includes a memory storing information regarding a position of the magnet 310, corresponding to the frequency of the frequency divided signal $S_{dm}$, to determine the position of the magnet 310 according to the frequency $f\_S_{dm}$ of the frequency divided signal Sdm provided by the arithmetic processor 343.

Figure 8:
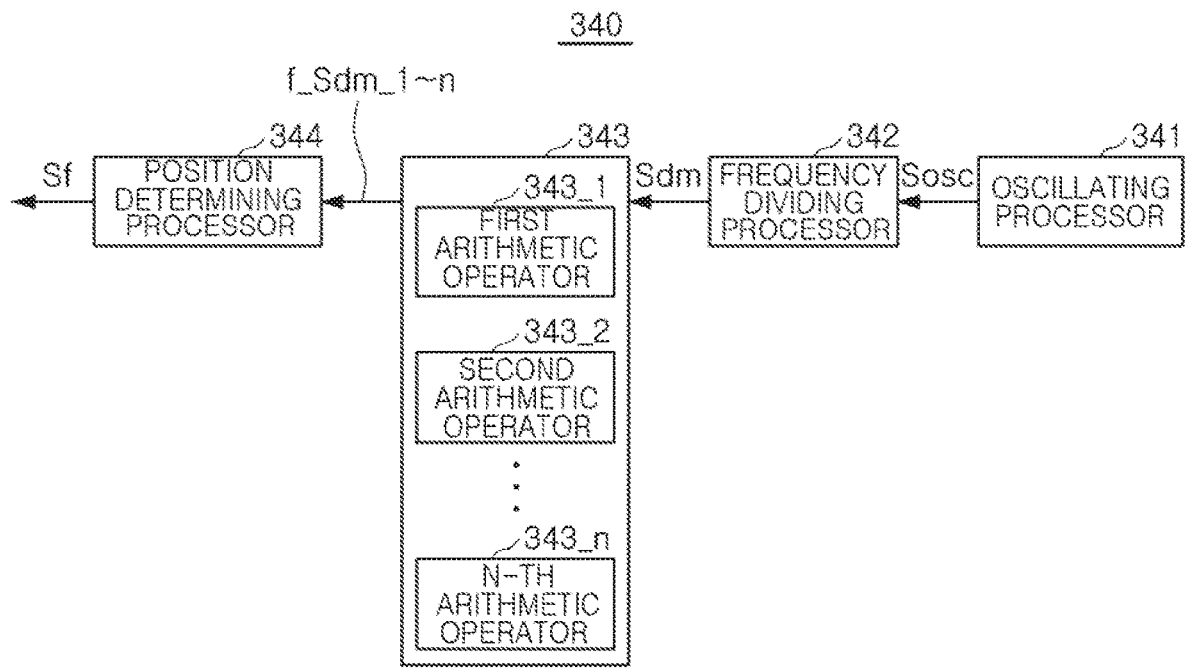
FIG. 8 is a block diagram of a position estimating processor, according to another example.
Figure 9:
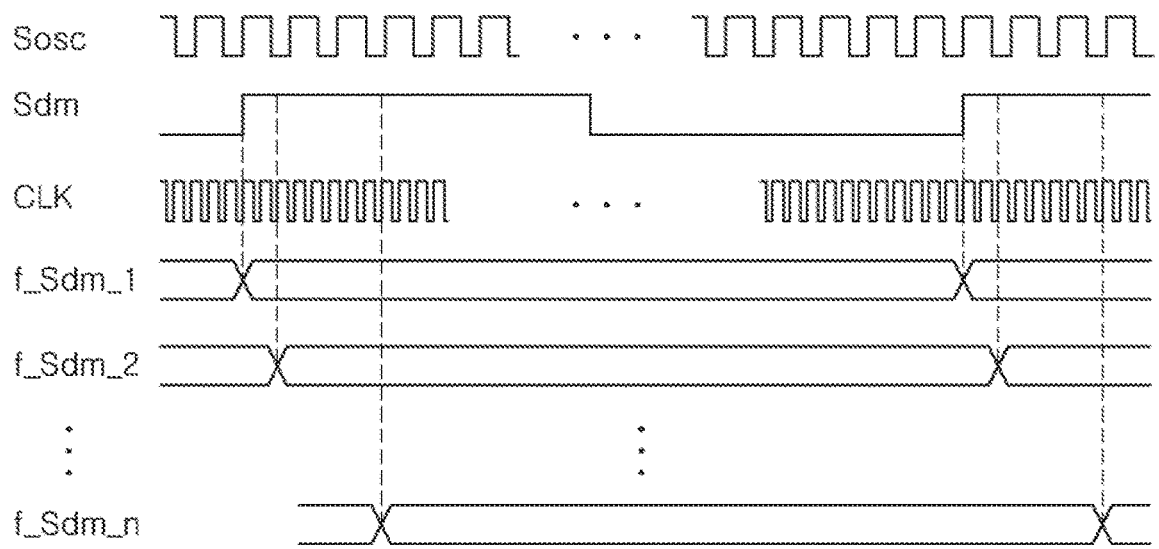
FIG. 9 is a signal waveform diagram of main portions of the position estimating processor, according to the example of FIG. 8.

FIG. 8 is a block diagram illustrating a position estimating processor, according to another example, and FIG. 9 illustrates signal waveforms of main portions of a position estimating processor, according to the example of FIG. 8. Hereinafter, an operation of detecting a position of a magnet 310 by a position estimating processor 340 will be described in detail with reference to FIGS. 3, 8, and 9.

The position estimating processor 340, according to an example, includes an oscillating processor 341, a frequency dividing processor 342, an arithmetic processor 343, and a position determining processor 344.

Because the position estimating processor 340, according to the example of FIG. 8, is similar to the position estimating processor 340 according to the example of FIG. 5 in terms of a configuration, the same or overlapping descriptions will be omitted and differences therebetween will be mainly described.

Comparing the position estimating processor 340 according to the example of FIG. 5 with the position estimating processor 340 according to the example of FIG. 8, the arithmetic processor 343 of the position estimating processor 340, according to the example of FIG. 8, may further include a plurality of arithmetic operators 343_1 to 343_n.

The arithmetic processor 343 calculates a frequency of a frequency divided signal $S_{dm}$ using a reference clock CLK. The plurality of arithmetic operators 343_1 to 343_n respectively and sequentially calculate frequencies $f\_S_{dm\_1}$ to n of the frequency divided signal $S_{dm}$ by delaying a measurement time point of one period of the frequency divided signal $S_{dm}$, at predetermined reference times.

For example, a first arithmetic operator 343_1 counts the number of frequency signals of the reference clock CLK within a single period of the frequency divided signal $S_{dm}$ at one measurement time point, and calculates the frequency $f\_S_{dm\_1}$ of the frequency divided signal $S_{dm}$ at one measurement time point using the counted number of frequency signals of the reference clock CLK and the frequency of the reference clock CLK.

A second arithmetic operator 343_2 counts the number of frequency signals of the reference clock CLK, within a single period of the frequency divided signal $S_{dm}$, at a point of time delayed from one measurement time point by a reference time. The second arithmetic operator 343_2 calculates a frequency $f\_S_{dm\_2}$ of the frequency divided signal $S_{dm}$ at a point in time delayed from one measurement time point by a reference time using the counted number of frequency signals of the reference clock CLK and the frequency of the reference clock CLK.

In addition, an n-th arithmetic operator 343_n counts the number of frequency signals of the reference clock CLK within a single period of the frequency divided signal $S_{dm}$ at a point in time delayed from one measurement time point by an n−1th reference time. The n-th arithmetic operator 343_n calculates a frequency $f\_S_{dm\_n}$ of the frequency divided signal Sdm at a point in time delayed from one measurement time point by an n−1th reference time using the counted number of frequency signals of the reference clock CLK and the frequency of the reference clock CLK.

The reference time is set to be shorter than the period of the frequency divided signal $S_{dm}$. As a result, the plurality of arithmetic operators 343_1 to 343_n may overlap in partial intervals in such a manner that the frequency of the frequency divided signal $S_{dm}$ may be measured in parallel.

The position determining processor 344 receives the frequencies $f\_S_{dm\_1}$ to n of the frequency divided signal $S_{dm}$ from the arithmetic processor 343, and determines the position of the magnet 310 according to the frequencies of the frequency divided signal $S_{dm}$.

According to an example, the position determining processor 344 may continuously determine the precise position of the magnet 310 using the frequencies $f\_S_{dm\_1}$ to n of the frequency divided signals $S_{dm}$ measured at a plurality of measurement points in time.

According to the example, as the position of the magnet is detected using the oscillating circuit, without employing a separate hall sensor, manufacturing costs may be reduced and space efficiency may be improved.

As set forth above, according to an example, a camera module and an actuator thereof may precisely detect a position of a magnet from frequency variation of an oscillating signal.

Furthermore, because a separate hall sensor is not employed, a manufacturing cost of a camera module actuator is reduced and space efficiency thereof is improved.

The driving processor 330, the position estimating processor 340, the position determining processor 344, the arithmetic processor 343, the oscillating processor 341, the frequency dividing processor 342, and the first through N-th arithmetic operators 343_1 through 343_n in FIGS. 3-5 and 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module actuator, comprising:
   a magnet;
   a coil disposed to face the magnet;
   a driver configured to move the magnet by applying a driving signal to the coil; and
   a position estimating processor configured to estimate a position of the magnet from an oscillating signal, wherein a frequency of the oscillating signal varies according to a movement of the magnet.

2. The camera module actuator of claim 1, wherein the position estimating processor estimates the position of the magnet from the frequency of the oscillating signal calculated by counting a reference clock using the oscillating signal.

3. The camera module actuator of claim 2, wherein the position estimating processor calculates the frequency of the oscillating signal using the counted number of the reference clock and a frequency of the reference clock.

4. The camera module actuator of claim 3, wherein the position estimating processor sequentially calculates the frequency of the oscillating signal by temporally delaying a counting point at reference times.

5. The camera module actuator of claim 1, wherein the position estimating processor estimates the position of the magnet, using information regarding the position of the magnet corresponding to the frequency of the oscillating signal.

6. The camera module actuator of claim 1, wherein the position estimating processor comprises an oscillating circuit generating the oscillating signal and comprising an inductor configured to determine the frequency of the oscillating signal.

7. The camera module actuator of claim 6, wherein the inductor is located within a range of a magnetic field of the magnet.

8. The camera module actuator of claim 1, wherein the position estimating processor generates a frequency divided signal by dividing the oscillating signal according to a reference ratio, and estimates the position of the magnet from a frequency of the frequency divided signal calculated by counting a reference clock using the frequency divided signal.

9. The camera module actuator of claim 8, wherein the frequency divided signal has a frequency lower than the frequency of the oscillating signal.

10. The camera module actuator of claim 6, wherein a magnetic substance is disposed between the oscillating circuit and the magnet.

11. A camera module actuator, comprising:
    a magnet;
    a coil disposed to face the magnet;
    a driver configured to move the magnet by applying a driving signal to the coil; and
    a position estimating processor comprising an inductor and configured to estimate a position of the magnet by converting an inductance of the inductor changed based on a movement of the magnet into a frequency.

12. The camera module actuator of claim 11, wherein the position estimating processor comprises an oscillating circuit comprising the inductor and configured to generate an oscillating signal, and wherein a frequency of the oscillating signal varies based on the inductance of the inductor.

13. The camera module actuator of claim 12, wherein the position estimating processor estimates the position of the magnet from the frequency of the oscillating signal calculated by counting a reference clock using the oscillating signal.

14. The camera module actuator of claim 13, wherein the position estimating processor sequentially calculates the frequency of the oscillating signal by temporally delaying a counting point at reference times.

15. The camera module actuator of claim 12, wherein the position estimating processor estimates the position of the magnet, using information about the position of the magnet corresponding to the frequency of the oscillating signal.

16. The camera module actuator of claim 12, wherein the position estimating processor generates a frequency divided signal by dividing the oscillating signal based on a reference ratio, and estimates the position of the magnet from a frequency of the frequency divided signal calculated by counting a reference clock using the frequency divided signal.

\* \* \* \* \*